Figure 1:
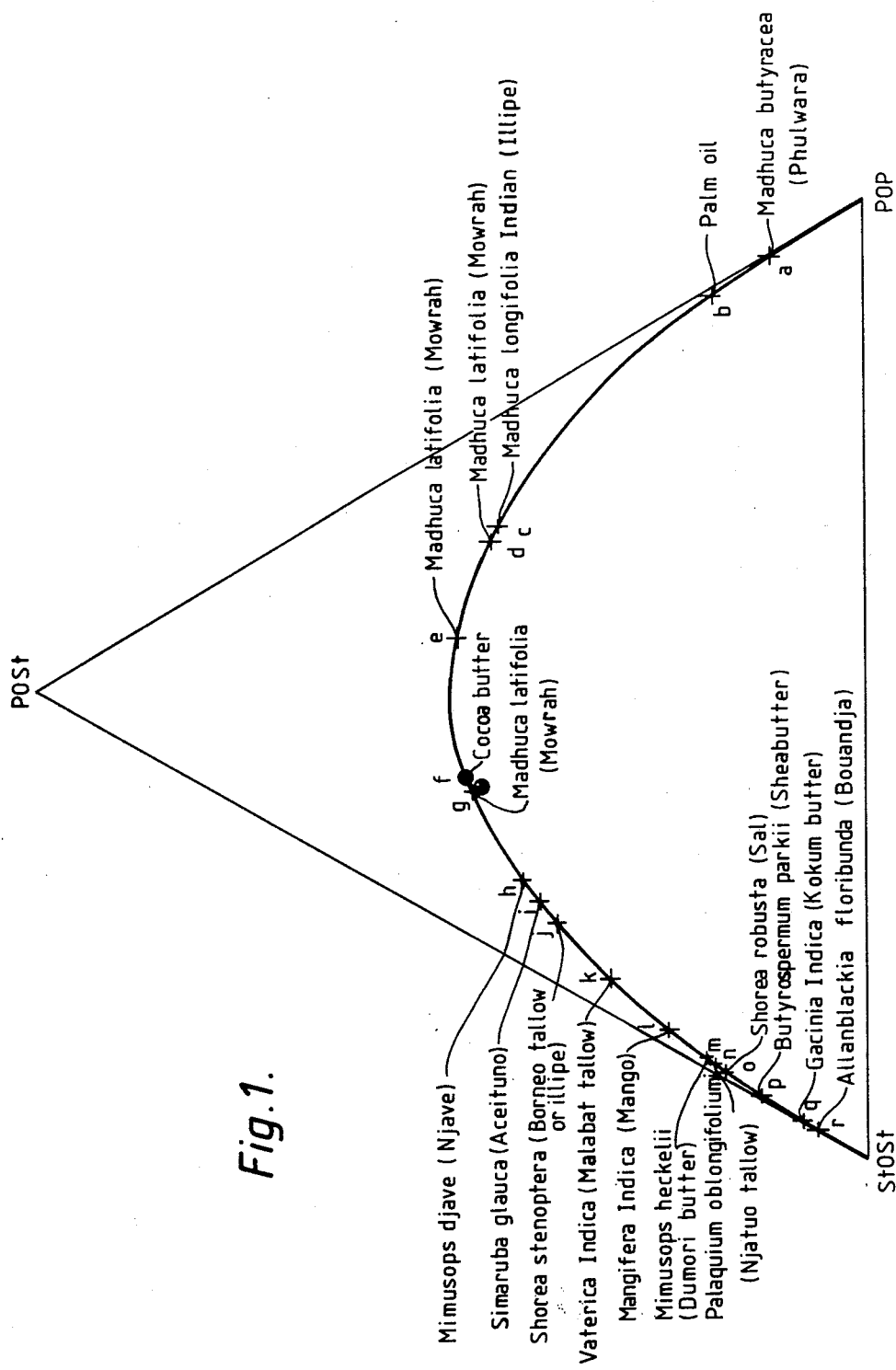

United States Patent [19]

Hargreaves

[11] 4,364,868

[45] Dec. 21, 1982

[54] COCOABUTTER REPLACEMENT FAT COMPOSITIONS

[75] Inventor: Neil G. Hargreaves, Billericay, England

[73] Assignee: Lever Brothers Company, New York, N.Y.

[21] Appl. No.: 230,825

[22] Filed: Feb. 2, 1981

[30] Foreign Application Priority Data

Feb. 7, 1980 [GB] United Kingdom ............... 8004109

[51] Int. Cl.³ ........................... C11C 3/02; C12P 7/64
[52] U.S. Cl. ............................... 260/410.7; 435/134; 435/917; 435/939
[58] Field of Search ...................... 260/410.7; 435/134

[56] References Cited

U.S. PATENT DOCUMENTS

| 3,492,130 | 1/1970 | Harwood | 260/410.7 |
| 3,541,123 | 11/1970 | Kawada | 260/410.7 |
| 4,247,471 | 1/1981 | Klein et al. | 260/410.7 |
| 4,275,011 | 6/1981 | Tanaka et al. | 260/410.7 |

FOREIGN PATENT DOCUMENTS 1431781 4/1976 United Kingdom .
1577933 10/1980 United Kingdom .

Primary Examiner—John F. Niebling
Attorney, Agent, or Firm—James J. Farrell

[57] ABSTRACT

Novel fat compositions are provided suitable for use as cocoabutter substitutes, which consist substantially of symmetrical disaturated triglycerides of $C_{16}$ and $C_{18}$ fatty acids. They may be obtained by interesterification in the presence or absence of the free fatty acids, using a 1,3-selective lipase enzyme catalyst to effect a limited degree of randomization in these positions.

20 Claims, 2 Drawing Figures

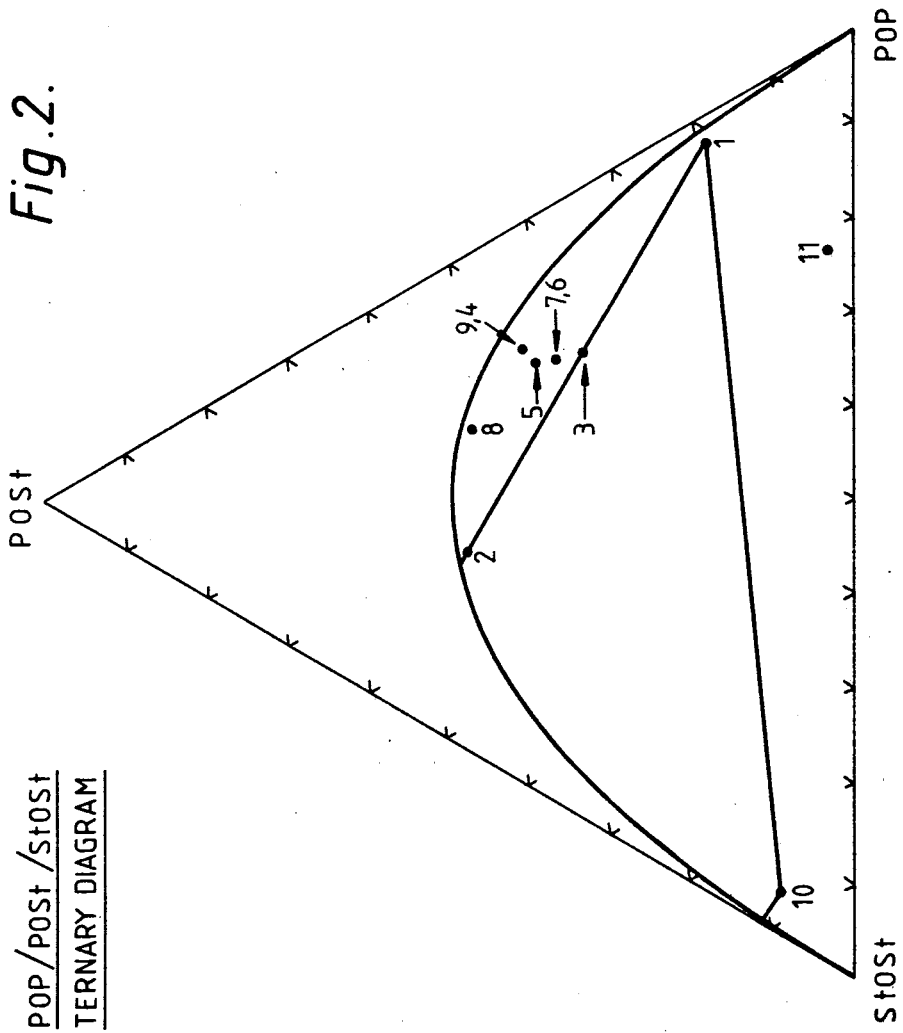

COCOABUTTER REPLACEMENT FAT COMPOSITIONS

This invention relates to chocolate fats.

Cocoabutter is rich in the three 2-oleyl disaturated $C_{16}$ and $C_{18}$ fatty acid triglycerides POP, POSt and StOSt, where P=palmitic, O=oleic, and St=stearic. These confer the melting properties in particular for which the fat is highly prized. The relative proportions of these glycerides in this and other similar fats, which may be used for providing cocoabutter substitutes, may be represented as points on a ternary triangular composition diagram. The lines joining the points on the diagram represent the proportions of the glycerides in blends of the fats and form a polygonal figure on the diagram.

The figure is bounded by a curve representing the compositions of mixtures of the three glycerides in the proportions in which the two saturated acid residues in the 1- and 3-positions are randomly distributed among the three. The curve may be derived mathematically and conforms to the equation $Z^2 = 4\ XY$, where X=StOSt, Y=POP and Z=POSt. The above points representing natural fats in the diagram, fall on or very close to the curve because it happens, as the result of the plant metabolism involved, that 1,3-random distribution occurs in naturally-occurring vegetable fats between these three glycerides. The novel fat compositions lying under the curve outside the polygonal figure have been found useful in the art. A typical ternary diagram showing the curve and the principal natural fats lying on it appears in FIG. 1.

According to the present invention therefore novel fats useful for providing cocoabutter replacement fats in chocolate compositions comprise 2-oleyl disaturated triglycerides of $C_{16}$ and $C_{18}$ fatty acids in the relative proportions represented on a ternary POP/POSt/StOSt composition diagram outside the polygonal figure, as hereinafter defined, bounding natural fats and their blends and under the curve for the triglycerides in 1,3-random distribution.

The polygonal figure representing known fats and their blends lies below the curve for fully 1,3-randomised compositions on which natural fats lie and above the POP/StOSt base line of the ternary diagram. The base line of the polygon on the diagram is drawn between the natural fats consisting most nearly of POP and StOSt respectively. These are palm and shea oils, but since in practice both contain a few percent POSt the base line of the polygonal figure lies correspondingly above the POP/StOSt base line of the diagram. The novel compositions of the invention lie both above and below the base line of the polygonal figure. Those above it lie within segmental areas cut from the curve by the other sides of the polygonal figure. Those below it lie in the roughly trapezoidal area between the base lines of the diagram and the figure.

Novel fat compositions of the invention may be obtained with the aid of the selective randomisation method described in our British Pat. No. 1,577,933. According to this method the fatty acid residues in 1,3-positions of glycerides are randomised selectively, under the influence of an appropriate enzyme catalyst, for example *Aspergillus niger*. The selective randomisation of its glycerides shifts the position of a fat or fat mixture lying on the diagram below the curve and within the boundaries of the polygonal figure, to a point nearer the curve until it falls within one or other of the novel areas in accordance with the invention. At this stage the 1,3-randomisation is still incomplete. It may be effected with or without overall change in fatty acid composition of the three principal fatty acids concerned. The randomisation may also be carried out in the presence of free palmitic or stearic acid to change the overall composition.

If the selective 1,3-randomisation is continued to completion then a fat composition is obtained falling on the curve and blending is necessary with suitable fat to provide a composition falling within one or other of the segmental areas. In particular, POP, StOSt and/or POSt which may be obtained by synthesis, can be used for this purpose.

A limited change in the relative proportions of POP/POSt/StOSt in a natural fat may occur on fractionation for the removal of other glycerides from the fat, but this method is not highly effective.

These novel fats of the invention which appear below the base line of the polygonal figure in the diagram may similarly be obtained by depletion of the POSt content of natural fats and their blends, for example by the above interesterification method using either palmitic acid or stearic acid as a reactant with the glycerides of the fats.

It has already been proposed in our British Pat. No. 1,431,781 to blend a mid-fraction of palm oil containing substantial amounts of POP with inter alia 1,3-distearyl-2-oleyl glyceride, of at least 85% purity and such compositions are excluded from the scope of the present invention. Subject to this exception the novel compositions of the invention may be obtained by use of synthetic triglycerides. However, the invention extends the area of fat compositions obtainable without synthesis of the separate 2-oleyl palmityl and stearyl glycerides. The flexibility of fat formulations in the chocolate trade and in others is thereby increased, for example for suppository fats, where triglyceride formulations must be adapted to meet specific physical requirements, particularly for melting and solidification characteristics, many combinations of which have hitherto appeared difficult to meet. Compositions with similar physical attributes, particularly relating to desired melting performance, may be plotted on the diagram and extrapolated through the areas of the novel compositions of the present invention to predict those of the novel compositions which have similar characteristics. For example, the fats of the invention preferably exhibit a solids content (N value) at 35° C. of about 3% and at 30° C. of about 30% or more, measured by pulse NMR (Fette, Seife und Anstrichmittel, 80, 1978 p. 180). These characteristics are exhibited by an area of POP-rich blends falling in the polygonal figure, and in areas outside in accordance with the invention, both above and below the figure. Above it is a segment extending between the compositions of cocoabutter and palm oil on the curve. Below it is another area of compositions meeting these characteristics. Another range of compositions in accordance with the invention substantially satisfies the requirements $N_{35}$ about 4% and $T_{max} \geq 28.3°$ C. Yet another range of fat compositions according to the invention, falling within areas above and below the figure described, substantially meets the requirements $T_{max} \geq 29°$ C. with a minimum rise of 3.5° C., and $D_{35} \leq 6\%$, Many others may be shown on the diagram.

Preferably the compositions of the invention consist substantially of the three triglycerides POP/POSt/

StOSt but other triglycerides may be present, in an amount not exceeding approximately 30% of the total composition, preferably 20% or less. Natural fats containing substantial amounts of these three triglycerides may be concentrated by means such as fractional crystallisation familiar to those skilled in the art, without disturbing their relative proportions, to produce in practice fats which, while they may not consist entirely of these glycerides, are to all intents and purposes fully randomised in the 1,3-positions. In particular, a mid-fraction of palm oil may be obtained consisting substantially of the three triglycerides in proportions virtually representing complete 1,3-randomisation and the same applies to a shea fraction from which lower melting glycerides have been removed.

EXAMPLE 1

A mixture of a mid-fraction of palm oil with stearic acid was interesterified in the weight ratio of 1:0.15, using the method described in our British Pat. No. 1,577,933 including the use on a Celite support of *Aspergillus niger* lipase as enzyme catalyst which is selective in its randomisation action, in the 1- and 3-positions only of fatty acid glycerides. Randomisation of these positions is demonstrably completed from the analysis of the POP/POSt/StOSt of a mid-fraction of the crude product which was found to lie precisely on the 1:3-randomisation curve of a POP/POSt/StOSt ternary composition diagram. Analysis was by a combination of preparative silver HPLC, details of which appear in J. Chromatography, 188, (1980), pages 205–212, by Smith, Jones and Hammond, and carbon number by GLC analytical methods. The analytical data is given in Table 1.

The first of these methods provides an eluent from the chromatography column consisting of a symmetrical disaturated triglyceride fraction which is separated in the second method according to carbon number into a series of three fractions. It is assumed that all the unsaturated acid is $C_{18}$ and that all the saturated acid present is $C_{16}$ or $C_{18}$. A very limited amount of $C_{48}$ and $C_{56}$ is reported in Table 1 and no substantial error therefore seemed likely in normalising the compositions between the three possible glycerides, from the carbon number analysis using the above assumptions.

TABLE 1

| | A<br>Palm<br>mid-<br>fraction | B<br>Cocoa<br>butter | C<br>Product<br>mid-<br>fraction | A + C<br>50:50 | B + C<br>15:85 |
|---|---|---|---|---|---|
| N values °C. | | | | | |
| 20 | 81.6 | 70.9 | 88.2 | 84.3 | 72.4 |
| 25 | 67.7 | 64.4 | 78.4 | 68.7 | 66.4 |
| 30 | 38.6 | 40.1 | 48.9 | 43.1 | 40.3 |
| 32 | 9.7 | 11.4 | 14.6 | 9.5 | 8.6 |
| 35 | 3.0 | 0.4 | 8.2 | 4.8 | 0.3 |
| 40 | 0 | 0.6 | 2.0 | 0.7 | 0.1 |
| Carbon No. | | | | | |
| $C_{48}$ | 2.4 | 0.5 | 1.3 | | |
| $C_{50}$ | 74.6 | 20.3 | 55.9 | | |
| $C_{52}$ | 17.0 | 47.1 | 35.9 | | |
| $C_{54}$ | 5.7 | 30.4 | 6.3 | | |
| $C_{56}$ | 0.2 | 1.4 | 0.2 | | |
| 100% { POP | 76.7 | 20.7 | 57.0 | | |
| POSt | 17.5 | 48.2 | 36.6 | | |
| StOSt | 5.8 | 31.1 | 6.4 | | |

The mid-fraction of the crude reaction product was obtained after filtering-off the supported catalyst and first fractionating at 10° C. from 1.6 times its weight of hexane. After washing twice, each time with hexane at 10° C., the precipitate was extracted twice at 40° C. with 98% aqueous methanol to remove residual free fatty acid and finally recrystallised from four times its weight of acetone containing 0.5% water at 5° C.

The mid-fraction recovered was blended first with its own weight of a palm mid-fraction and also with cocoabutter in the weight proportions 15:85. The change in solids content with temperature was measured by a pulse NMR and the N-values obtained for these compositions according to the invention are compared in Table 1 with those for the components of the blends.

The close comparison shown in Table 1 between palm mid-fraction and cocoabutter and their blends with the enzyme mid-fraction indicates that substantial amounts of the latter may be blended with either fat without materially affecting their melting characteristics.

EXAMPLE 2

FIG. 2 shows a ternary diagram with compositions marked as below in Table 2 of various novel fat compositions according to the invention and their relationship with the 1,3-random distribution curve $Z_2 = 4$ XY. The fat compositions from which the novel fats were prepared are given in Table 2 and in Table 3 their experimentally-determined POP/POSt/StOSt compositions are listed. These were obtained as in Example 1. Table 4 shows the solid contents both of the originating fats and the novel fat compositions, determined by pulse NMR.

Referring to FIG. 2, the novel compositions of the invention are seen to lie under the curve within the area bounded by the chord to the curve drawn between the compositions of palm mid-fraction (1) and cocoabutter (2), falling substantially on the curve and representing between them blends of the two fats in various proportions, including blend (3) with equal amounts of these two fats.

TABLE 2

| | Formulation of Fat Blends |
|---|---|
| Code | Formulations |
| 1 | Palm mid-fraction (PMF) |
| 2 | Cocoabutter |
| 3 | Cocoabutter + palm mid-fraction (50:50) |
| 4 | Interesterified cocoabutter/PMF (50:50) |
| 5 | Blend 4 - fractionated |
| 6 | Blend 5 + Blend 3 (50:50) |
| 7 | Blend 3 + POSt (96:4) |
| 8 | Interesterified palm mid-fraction/stearic acid (67:33) |
| 9 | Blend 8 + PMF (77:23) |
| 10 | Shea stearine |
| 11 | Shea stearine + POP (70:30) |

The novel fats were prepared according to the following methods:

(a) Sample (4)—by incomplete enzymic interesterification of blend (3). This method followed that described in our British Pat. No. 1,577,933, using a continuous method in which the feedstock blend was passed through a column containing a packed bed of Celite and the enzyme catalyst. The feedstock consisted of the fat mixture dissolved in a petroleum ether, boiling point 100°–120° C., approximately a kilogramme of the fat being dissolved in 2.73 liters of the solvent. The feed rate was adjusted by trial and error to give incomplete interesterification. Further details were as follows:

The column was 1.5 cm in diameter and the packing was in two parts separated by suitable support means. The lower part consisted of 4 gms of dried Celite mixed with 3.6 gms of water and was present to ensure that the feedstock, introduced into the base of the column, was substantially saturated with water. The upper bed, which was prepared as described in the above patent specification and was based on 7 gms of dried Celite with *Rhizopus Japonicus,* had an activity of 1.1 units/mg. This active packing was wetted with 10% water before packing. Before the preparation of both parts of the packing, the Celite was adjusted to pH 7 by slurrying with dilute hydrochloric acid and dried off.

The feed was supplied at 40° C. and an appropriate feed rate was established for incomplete esterification at between 10 and 20 mls/hour. The product collected over the first 24 hours was discarded to minimise hydrolysis in the final product which was collected over the following seven days. After solvent removal the product contained 3% free fatty acid.

(b) Sample (5)—by fractionating sample (4). Fat product (4) was fractionated from a solution of five times its weight in acetone, maintained for an hour at 20° C., the precipitated fat crystals being washed once with an equal weight of acetone to yield 5.87% crystals in a stearine fraction, which was discarded. The remaining oleine fraction was again fractionated by holding for an hour at 5° C. in a 10 wt % acetone solution, the precipitate being washed twice with acetone. The stearine fraction representing novel product (5) was recovered at a fractionation yield of 67.4% and was substantially free from uncombined fatty acid, most of which remained in the oleine fraction.

(c) Sample (8)—prepared generally as described in (a) but in the presence of free fatty acid, using a packed bed in a column 5 cms diameter and containing 540 gms of catalyst comprising enzyme APG manufactured by Novo on Celite and prepared as described in the above British patent specification. The enzyme of the catalyst was *Aspergillus niger.* The column was maintained at 40° C. and the feed supplied to it consisted of a mixture, dissolved in twice its weight of hexane, of palm mid-fraction with half its weight of stearic acid and water amounting to 0.07 wt % of the solution which was supplied to the column at a rate of 0.8 kgms/hour. A first fractionation was carried out by holding a solution of the product in 1.6 times its weight of hexane at 8° C., the crystals being washed once with hexane. A yield of 62% oleine was recovered which was extracted at 40° C. in a separatory funnel with methanol containing 2% water to remake free fatty acid, the amount of this extracting solvent being four times the weight of recovered oleine. The separated oil phase was again fractionated from a solution in four times its weight of acetone which was maintained for an hour at 5° C., the precipitate being washed twice with acetone.

A yield of 68% stearine fraction was recovered, giving an overall yield of 30% approximately.

The fractionated fat was finally eluted in a 10% solution in a mixture of equal parts of diethyl ether and hexane, through a column packed with silica gel in an amount approximately ten times the weight of fat treated. The silica gel was 60 to 120 mesh. An overall yield of product (8) was obtained of 24.2%.

(d) Samples (6) and (9)—by blending. Reference should be made to Table 2.

(e) Samples (7) and (11)—by addition of synthetic triglycerides to fats. Sample (11) is of particular interest, being outside the polygonal figure above described, but containing less POSt rather than more, in comparison with blends represented by the sides of the polygon.

The solids content data in Table 4 indicates that, with the exception of the unfractionated product (4), all the novel products of the invention are useful confectionery fats.

| Fat/Blends | Carbon Number Analysis of the SOS triacyl glycerols prepared by preparative silver phase HPLC | | | | | Normalised POP/POSt/StOSt composition of the SOS triacyl glycerols | | |
|---|---|---|---|---|---|---|---|---|
| | C48 | C50 | C52 | C54 | C56 | POP | POSt | StOSt |
| 1 Palm mid fraction | 2.3 | 77.2 | 17.3 | 2.8 | 0.2 | 79.4 | 17.7 | 2.9 |
| 2 Cocoa butter | 0.3 | 20.4 | 46.9 | 30.5 | 1.6 | 20.9 | 47.9 | 31.2 |
| 3 Cocoa butter + PMF (50:50) | 1.2 | 48.4 | 32.4 | 16.9 | 1.0 | 49.5 | 33.2 | 17.3 |
| 4 Interesterified Cocoa butter/PMF (50:50) | 1.3 | 45.4 | 40.1 | 12.2 | 0.8 | 46.5 | 41.1 | 12.4 |
| 5 Interesterified Cocoa butter/PMF (50:50) Fractionated | 0 | 45.0 | 38.7 | 15.1 | 0.9 | 45.6 | 39.1 | 15.3 |
| 6 Blend 5 + Blend 3 (50:50) | 1.0 | 46.1 | 36.4 | 15.4 | 0.9 | 47.1 | 37.2 | 15.7 |
| 7 Blend 3 + POSt (96:4) | 0.7 | 43.1 | 34.9 | 15.8 | 0.84 | 46.0 | 37.2 | 16.8 |
| 8 Interesterified PMF/Stearic acid (67:33) | 0.7 | 33.4 | 47.0 | 18.1 | 0.6 | 33.9 | 47.7 | 18.4 |
| 9 Blend 8 + PMF (77:23) | 0.7 | 44.1 | 40.6 | 14.0 | 0.5 | 44.7 | 41.1 | 14.2 |
| 10 Shea stearine | 0.4 | 4.2 | 8.6 | 81.8 | 4.5 | 4.4 | 9.1 | 86.5 |
| 11 Shea stearine + POP (70:30) | 0.1 | 74.6 | 2.9 | 21.0 | 1.1 | 75.7 | 3.0 | 21.3 |

| PULSE NMR SOLIDS CONTENT | | | | | | |
|---|---|---|---|---|---|---|
| | Temperature °C. | | | | | |
| Fat/Blend | 20 | 25 | 30 | 32.5 | 35 | 40 |
| 1 Palm mid fraction | 86.6 | 75.7 | 47.1 | 16.8 | 3.3 | 0.2 |
| 2 Cocoa butter | 74.8 | 68.2 | 41.6 | 13.9 | 1.1 | 0.0 |
| 3 Cocoa butter + PMF (50:50) | 71.4 | 56.7 | 15.8 | 2.3 | 0.5 | 0.0 |
| 4 Interesterified cocoa butter/PMF (50:50) | 32.6 | 23.6 | 10.5 | 6.4 | 1.7 | 1.1 |
| 5 Interesterified cocoa butter/PMF (50:50) Fractionated | 73.0 | 59.3 | 7.7 | 0.0 | 0.0 | 0.0 |
| 6 Blend 5 + Blend 3 (50:50) | 69.3 | 56.2 | 11.0 | 1.4 | 0.1 | 0.0 |
| 7 Blend 3 + POSt (96:4) | 70.9 | 56.8 | 15.7 | 2.7 | 0.5 | 0.3 |
| 8 Interesterified PMF/Stearic acid (67:33) | 81.2 | 70.0 | 34.7 | 11.3 | 5.4 | 0.4 |
| 9 Blend 8 + PMF (77:23) | 76.0 | 62.2 | 19.8 | 7.6 | 3.3 | 0.0 |
| 10 Shea stearine | 78.8 | 75.0 | 65.2 | 51.3 | 13.0 | 2.4 |
| 11 Shea stearine + POP (70:30) | 87.6 | 82.9 | 51.8 | 7.8 | 0.6 | 0.8 |

What is claimed is:

1. Cocoabutter replacement fat composition consisting essentially of a ternary triglyceride mixture of POP, POSt and StOSt represented on a ternary X/Y/Z composition diagram as exemplified in FIG. 1 under the curve $Z^2=4\ XY$, where X=StOSt, Y=POP and Z=POSt, outside a polygonal figure bounding the composition of POP, POSt and StOSt in natural fats and their blends on the diagram as exemplified in FIG. 1.

2. Composition according to claim 1 lying within a segment of the said curve.

3. Composition according to claim 2 wherein the said segment is bounded on the curve by a chord extending substantially from the composition on the curve of cocoabutter to that of palm oil.

4. Composition according to claim 1 lying on the ternary diagram below a chord of the curve extending substantially from the composition of shea fat to that of palm oil.

5. Composition according to claim 1 selected from the group consisting of synthetic StOSt, POSt, POP, their mixtures with each other and with natural fats and their fractions.

6. Composition according to claim 1, at least part of which comprises a 1,3-selectively randomised fat.

7. Composition according to claim 6 comprising a fat incompletely randomised selectively in the 1- and 3- positions.

8. Composition according to claim 1 comprising up to 20% other triglycerides, balance POP, POSt and/or StOSt.

9. Composition according to claim 1 which contains palm mid-fraction or shea fat.

10. Composition according to claim 1 having a solids content at 35° C. of about 3% and at 30° C. of at least 30%.

11. Composition according to claim 1 having a solids content at 35° C. of about 4% and $T_{max}$ at least 28.3° C.

12. Composition according to claim 1 having a $T_{max}$ of at least 29° C. with a minimum rise of 3.5° C. and $N_{35}$ of at most 6%.

13. Novel fats having a composition as shown by points (4), (5), (6), (8) and (11) on FIG. 2 of the accompanying drawings.

14. Composition as claimed in claim 1 in a blend with cocoabutter.

15. Method of preparing a composition as claimed in claim 1, wherein a fat comprising symmetrical disaturated triglycerides of $C_{16}$ and $C_{18}$ fatty acids is subjected to selective randomisation in the 1- and 3-positions in the presence of a lipase enzyme catalyst and a small amount of water effective to activate the catalyst.

16. Process according to claim 15, wherein the selective randomisation is discontinued before completion.

17. Process according to claim 15, wherein the randomised fat is blended with a natural fat.

18. Process according to claim 15, wherein the randomised fat is blended with synthetic POP, POSt, and/or StOSt.

19. Continuous process according to claim 15, wherein a stream of the fat in solution is directed over a fixed bed of selective enzyme catalyst and the randomised fat is recovered from the effluent by removal of the said solvent.

20. Process according to claim 19, wherein the extent of selective 1,3-randomisation of the fat is limited by adjusting the rate of flow of the stream.

* * * * *